United States Patent [19]

Budd

[11] 4,309,785

[45] Jan. 12, 1982

[54] ALIGNING APPARATUS FOR TRAILER BOATS

[76] Inventor: Edward J. Budd, 19 Prince St., Brighton, Queensland, 4017, Australia

[21] Appl. No.: 86,527

[22] Filed: Oct. 19, 1979

[30] Foreign Application Priority Data

Oct. 19, 1978 [AU] Australia ............................. PD6461

[51] Int. Cl.³ .......................................... B63B 21/64
[52] U.S. Cl. ....................................... 9/1.2; 414/599
[58] Field of Search .................. 9/1.1, 1.2; 414/599, 414/538; 114/230, 263, 250, 251, 253; 280/414 R

[56] References Cited

U.S. PATENT DOCUMENTS 3,124,259  3/1964  Goettl ............................. 280/414 R
4,010,962  3/1977  Groblebe ........................ 280/414 R Primary Examiner—Trygve M. Blix
Assistant Examiner—Jesús D. Sotelo
Attorney, Agent, or Firm—McAulay, Fields, Fisher, Goldstein & Nissen

[57] ABSTRACT

Aligning apparatus for securing to a boat for maintaining thereof in operative relationship to a trailer during launching and retrieving operations. A strut assembly is provided with one end connected to the trailer and extends transversely away thereof, and a line extends from a support at the other end of the strut assembly to the stern of the boat and passes forwardly to a position adjacent the front of the trailer. The strut assembly is of such a length that the support is spaced outwardly from the trailer a distance sufficient to counteract athwartship movement of the stern.

9 Claims, 3 Drawing Figures

ALIGNING APPARATUS FOR TRAILER BOATS

This invention relates to aligning apparatus to facilitate launching and retrieving of trailable boats to and from the trailer.

Many people experience difficulty when launching or retrieving their boat from the trailer as a result of a tidal or wind influence which may cause the rear of the boat to drift sideways and place the boat out of alignment with the trailer. Generally, during retrieval operations, the person controlling the boat prior to hauling it on to the trailer, stands adjacent the bow of the boat in relatively shallow water and attempts to maintain the boat in a stern-out attitude so that it will not sit skew to the trailer. However, from this position it is difficult to maintain the boat in its retrieving attitude and as a result, problems frequently occur as a result of the boat lying skew to the trailer and thus being unable to be winched thereon.

Accordingly, the present invention has been devised to provide aligning apparatus which may be conveniently secured to a boat trailer to enable the boat to be maintained in alignment with the trailer during launching and retrieving operations. Other objects and advantages of the invention will hereinafter become apparent.

With the foregoing and other objects in view, this invention resides broadly in aligning apparatus for maintaining a boat in operative relationship to a trailer during launching and retrieving operations, said aligning apparatus including a strut assembly having locating means at one end for connection to said trailer in an operative manner in which said strut assembly extends tranversely away from said trailer and support means at the other end of said strut assembly for a line adapted to extend from said support means to the stern of the boat and said line passing forwardly to a position adjacent the front of the trailer and said strut assembly being of such length that said support means is spaced outwardly from said trailer a distance sufficient to enable said line to be tensioned to counteract athwartship movement of said stern.

According to a further aspect, this invention resides in a trailer assembly of the type including a wheeled supporting frame adapted to be operatively connected to a towing vehicle and having thereon a plurality of boat supporting rollers, characterised in that said supporting frame is provided with, at each side thereof, mounting means for supporting aligning apparatus for maintaining a boat in operative relationship to the trailer during launching and retrieving operations, said aligning apparatus including a strut assembly having locating means at one end adapted to be connected to said support means to support said strut assembly and support means at the other end of said strut assembly for a line adapted to extend from said support means to the stern of the boat and said line passing forwardly to a position adjacent the front of the trailer, said strut assembly being of such length that said support means is spaced outwardly from said trailer a distance sufficient to enable said line to be tensioned to counteract athwartship movement of said stern.

In order that the invention may be more readily understood and put into practical effect, reference will now be made to the accompanying drawings which illustrate a preferred embodiment of the invention and wherein.

Figure 1:
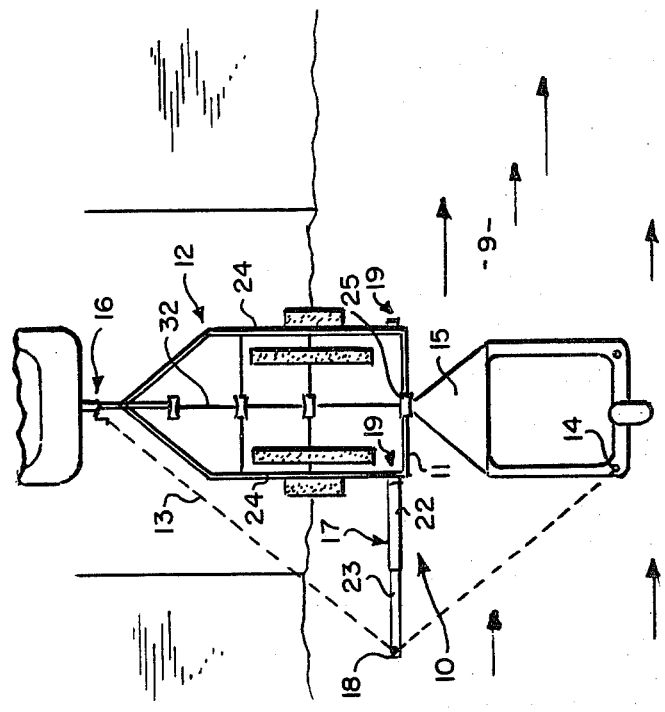
FIG. 1 is a plan view of a trailer and boat assembly with the boat floating adjacent the end of the trailer.
Figure 2:
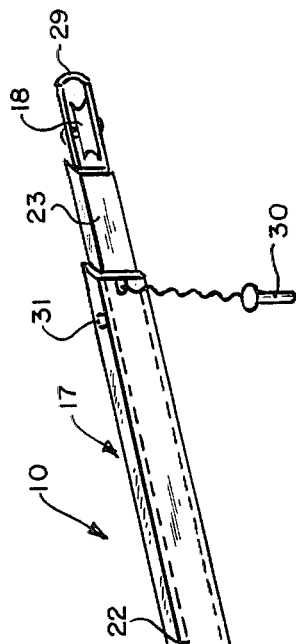
FIG. 2 is a perspective view of one form of aligning apparatus according to the present invention.

Referring initially to FIG. 1 and FIG. 2, there is shown aligning apparatus connected to the rear left hand corner portion 11 of a vehicle drawn trailer assembly 12 and disposed operatively to enable a control line 13 secured to the rear left hand corner 14 of a floating boat 15 and passing through the guide roller assembly 18 to pass forwardly to the person operating the trailer winch 16 for the purpose of hauling the boat 15 from the water on to the trailer 12.

It will be seen that the aligning apparatus 10 according to this embodiment is in the form of an extendible strut assembly 17 supported fixedly to the rear corner 11 of the trailer frame by a releasable mounting assembly 19 which comprises a square spigot bar 20 welded to the trailer frame 11 so as to extend upwardly therefrom for supporting in non-rotatable manner the correspondingly square shaped locating socket portion 21 fixed to the innermost end of the strut assembly 17. The strut assembly 17, as shown, comprises an outer tube 22 fixed to the socket portion 21 and an inner tube 23 supported retractably within the outer tube 22 and having a line guide roller assembly 18 at its outer end.

Suitably, the outer tube 22 and the inner tube 23 are each about five feet long so that the strut may be extended to the desired operative length. For use with say a twelve foot long boat, the strut would be extended to a length of eight feet, a distance equal to approximately two-thirds of the length of the boat, so that when the boat is positioned as shown in FIG. 1, with its bow at the rear of the trailer, the line 13 extends away from the boat at approximately 45 degrees whereby the line may be hand held and tensioned to enable the athwartship position of the stern of the boat to be controlled relative to the bow which is supported fixedly against the outermost roller 25.

As shown, the trailer assembly 12 is provided with a mounting assembly 19 at each rear corner thereof so that the extendible strut 17 can be mounted at either side of the trailer, depending on the direction of flow of the influencing tide or wind and it will be seen that the square spigot bar 11 will in use maintain the strut at right angles to the respective side rail 24 of the trailer 12. After use, the socket portion may be lifted from the spigot bar 20, turned through 90 degrees and replaced in a stowed attitude alongside the respective side rail 24 of the trailer. As the device may be used on tilting trailers, the strut assembly 17 extends upwardly away from the trailer so that the outer end thereof is maintained above the water.

Figure 3:
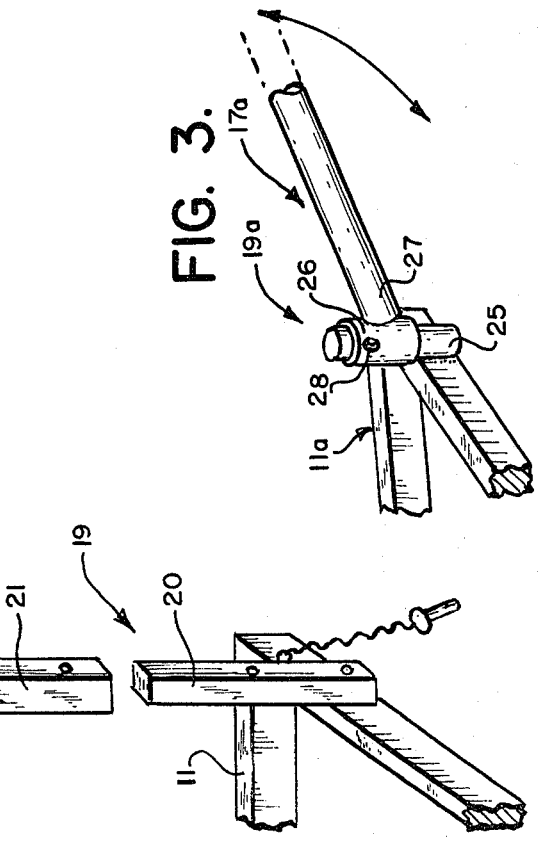
FIG. 3 illustrates an alternate pivotable support arrangement for the aligning apparatus of the present invention.

An alternate pivotable mounting is shown in FIG. 3 and in this embodiment, the extendible strut 17a (only portion of which is illustrated) is connected to the respective rear corner portion 11a of the trailer frame by means of a pivotable mounting 19a which comprises a support pin 25 fixed to the trailer frame 11a and a sleeve 26 which is rotatable about the pin 25 and which supports the innermost end 27 of the strut assembly 17a which extends upwardly and outwardly therefrom. The sleeve 26 is apertured as shown at 28 for insertion of a pin adapted to engage with corresponding apertures in the pin 25 when the strut assembly 17 is aligned operatively, extending transversely to the side frame of the trailer and inoperatively, when the strut assembly 17 extends longitudinally beside the trailer frame. For this purpose, the support pin 25 may be inclined forwardly so that when the support strut 17a is moved inwards, its outer end simultaneously moves downwards so that it lies alongside the trailer frame at a position at which it will not foul the underside of the boat supported on the trailer. Of course, alternate locking means may be utilised as desired.

In use, a skipper utilising the present invention may launch and retrieve a small boat single handed, with ease. For example, for retrieving purposes, the boat 15 is moved stem first to the rear of the trailer 12 and the winch cable 32 is connected to the stem to enable the boat to be hauled on to the trailer. The control line 13, which has been previously secured to the stern of the boat, at say the windward side, is passed through the becket 29 surrounding the guide roller 18 and the end of the control line is retained by the skipper. The extendible strut assembly is then extended to the desired extent and locked in place by use of the pin 30 which is passed through the aligned apertures 31 in the inner and outer tube provided for that purpose. The line is then carried forward to the winch position and as the boat is winched on to the trailer, the control line 13 is hauled in at a rate sufficient to keep the athwart position of the stern of the boat in line with the trailer against the prevailing wind. This will maintain the winch load at a minimum and will enable the boat to be quickly hauled on to the trailer. When the boat is in place on the trailer, the control line is removed and the strut assembly 17 is moved to its inoperative position adjacent the side rail 24 of the trailer assembly 12.

In a further embodiment of the invention, the winch assembly 16 is provided with an auxiliary drum for the control line 13 and the main winch and the auxiliary winch are adapted to rotate in unison at pre-selected relative speeds such that as the boat is hauled on to the trailer, the control line 13 is wound on to the drum at the correct rate so as to maintain the boat in alignment with the trailer. Of course, the control line could be secured to the outer end of the strut assembly to pass rearwardly about a pulley at the stern of the boat, then forwardly to the front of the trailer.

Of course, it will be realised that the above has been given only by way of illustrative example, and all such modifications and variations as would be apparent to persons skilled in the art are deemed to fall within the broad scope and ambit of the invention as is defined in the appended claims.

I claim:

1. Aligning apparatus for maintaining a boat in operative relationship to a trailer during launching and retrieving operations, said aligning apparatus including a strut assembly having locating means at one end for connection to said trailer in an operative manner in which said strut assembly extends transversely away from said trailer and support means at the other end of said strut assembly for a line adapted to extend from said support means to the stern of the boat and said line passing forwardly to a position adjacent the front of the trailer and said strut assembly being of such length that said support means is spaced outwardly from said trailer a distance sufficient to enable said line to be tensioned to counteract athwartship movement of said stern.

2. Aligning apparatus according to claim 1, wherein the length of said strut is approximately two-thirds the length of the boat being retrieved and said support means comprises a guide assembly for said line to enable the latter to be secured to the stern of the boat to pass forwardly to the front of said trailer through said guide assembly.

3. Aligning apparatus according to claim 2, wherein said strut assembly is in the form of an extendible strut, the operative length of which may be selectively varied.

4. Aligning apparatus according to claim 3, wherein said locating means is adapted to be detachably secured to said trailer.

5. Aligning apparatus according to claim 4, wherein said locating means is adapted to support said strut assembly on said trailer in an operative attitude, at which said strut assembly extends transversely away from said trailer or in a stowed attitude at which said strut assembly lies alongside said trailer.

6. Aligning apparatus according to claim 5, wherein said locating means is so made and arranged that said strut assembly when disposed in its operative attitude extends outwardly and upwardly away from said trailer.

7. Aligning apparatus according to claim 6, wherein said guide assembly comprises a sheave supported at the outer end of said strut assembly for rotation about a substantially vertical axis and retaining means to prevent said line dislodging from said sheave.

8. A trailer assembly of the type including a wheeled supporting frame adapted to be operatively connected to a towing vehicle and having thereon a plurality of boat supporting rollers, wherein said supporting frame is provided with, at each side thereof, mounting means for supporting aligning apparatus for maintaining a boat in operative relationship to a trailer during launching and retrieving operations, said aligning apparatus including a strut assembly having locating means at one end adapted to be connected to said mounting means to support said strut assembly and support means at the other end of said strut assembly for a line adapted to extend from said support means to the stern of the boat and said line passing forwardly to a position adjacent the front of the trailer, said strut assembly being of such length that said support means is spaced outwardly from said trailer a distance sufficient to enable said line to be tensioned to counteract athwartship movement of said stern.

9. A trailer assembly according to claim 8, wherein said mounting means is in the form of a spigot secured to respective rear side portion of said trailer and said locating means is a socket adapted to locate about said spigot.

* * * * *